(12) United States Patent
Sheets

(10) Patent No.: US 11,015,752 B2
(45) Date of Patent: May 25, 2021

(54) TUBING SPLICING DEVICE

(71) Applicant: Micheal Sheets, Elmira, NY (US)

(72) Inventor: Micheal Sheets, Elmira, NY (US)

( * ) Notice: Subject to any disclaimer, the term of this patent is extended or adjusted under 35 U.S.C. 154(b) by 333 days.

(21) Appl. No.: 16/167,637

(22) Filed: Oct. 23, 2018

(65) Prior Publication Data
US 2020/0124215 A1 Apr. 23, 2020

(51) Int. Cl.
*F16L 33/22* (2006.01)
*F16L 19/025* (2006.01)

(52) U.S. Cl.
CPC ........... *F16L 33/225* (2013.01); *F16L 19/025* (2013.01)

(58) Field of Classification Search
CPC ......... F16L 33/223; F16L 33/24; F16L 33/28; F16L 47/04; F16L 47/041; F16L 47/16; F16L 19/025; F16L 15/08
USPC ........................................................ 285/245
See application file for complete search history.

(56) References Cited

U.S. PATENT DOCUMENTS

| | | | |
|---|---|---|---|
| 3,606,396 A | 9/1971 | Prosdocimo | |
| 3,843,169 A * | 10/1974 | Wise | |
| D254,505 S | 3/1980 | Parsons | |
| 4,257,629 A | 3/1981 | Maple | |
| 4,775,171 A | 10/1988 | Marshall | |
| 5,176,415 A * | 1/1993 | Choksi | F16L 47/16 |
| D333,178 S | 2/1993 | Novy | |
| 5,332,269 A | 7/1994 | Homm | |
| 5,470,113 A | 11/1995 | Schwalm | |
| 7,163,238 B1 | 1/2007 | Mittersteiner | |
| 7,506,899 B2 | 3/2009 | Feith | |
| 7,784,838 B2 * | 8/2010 | Levy | 285/245 |
| 2006/0244256 A1 * | 11/2006 | Hyobu | F16L 19/025 |
| 2007/0164566 A1 * | 7/2007 | Patel | F16L 19/005 |
| 2012/0025519 A1 * | 2/2012 | Jung | F16L 47/16 |
| 2015/0137513 A1 * | 5/2015 | Glime, III | F16L 19/025 |
| 2015/0198273 A1 * | 7/2015 | Campbell | F16L 19/025 |
| 2016/0116093 A1 * | 4/2016 | Filipczak | F16L 33/223 |

* cited by examiner

Primary Examiner — Zachary T Dragicevich

(57) ABSTRACT

A tubing splicing device for repairing tubing includes a pair of housings. Each housing comprises a barrel, which is open-ended. A pipe, which is externally threaded, is positioned in and rotationally coupled to the barrel. The pipe is configured to be threadedly inserted into a respective segment of a tubular substrate so that the tubular substrate is drawn into a first end of the housing to sealably couple the pipe to the tubular substrate. A first coupler is coupled to a second end of one of the housings. A second coupler is coupled to a second end of other of the housings. The second coupler, being complementary to the first coupler, is positioned to couple to the first coupler to couple the one of the housings to the other of the housings. Concurrently, the pipes are sealably coupled to sealably couple two segments of the tubular substrate.

9 Claims, 3 Drawing Sheets

TUBING SPLICING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to splicing devices and more particularly pertains to a new splicing device for repairing tubing.

BRIEF SUMMARY OF THE INVENTION

An embodiment of the disclosure meets the needs presented above by generally comprising a pair of housings. Each housing comprises a barrel, which is open-ended. A pipe, which is externally threaded, is positioned in and rotationally coupled to the barrel. The pipe is configured to be threadedly inserted into a respective segment of a tubular substrate so that the tubular substrate is drawn into a first end of the housing to sealably couple the pipe to the tubular substrate. A first coupler is coupled to a second end of one of the housings. A second coupler is coupled to a second end of other of the housings. The second coupler, being complementary to the first coupler, is positioned to couple to the first coupler to couple the one of the housings to the other of the housings. Concurrently, the pipes are sealably coupled to sealably couple two segments of the tubular substrate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
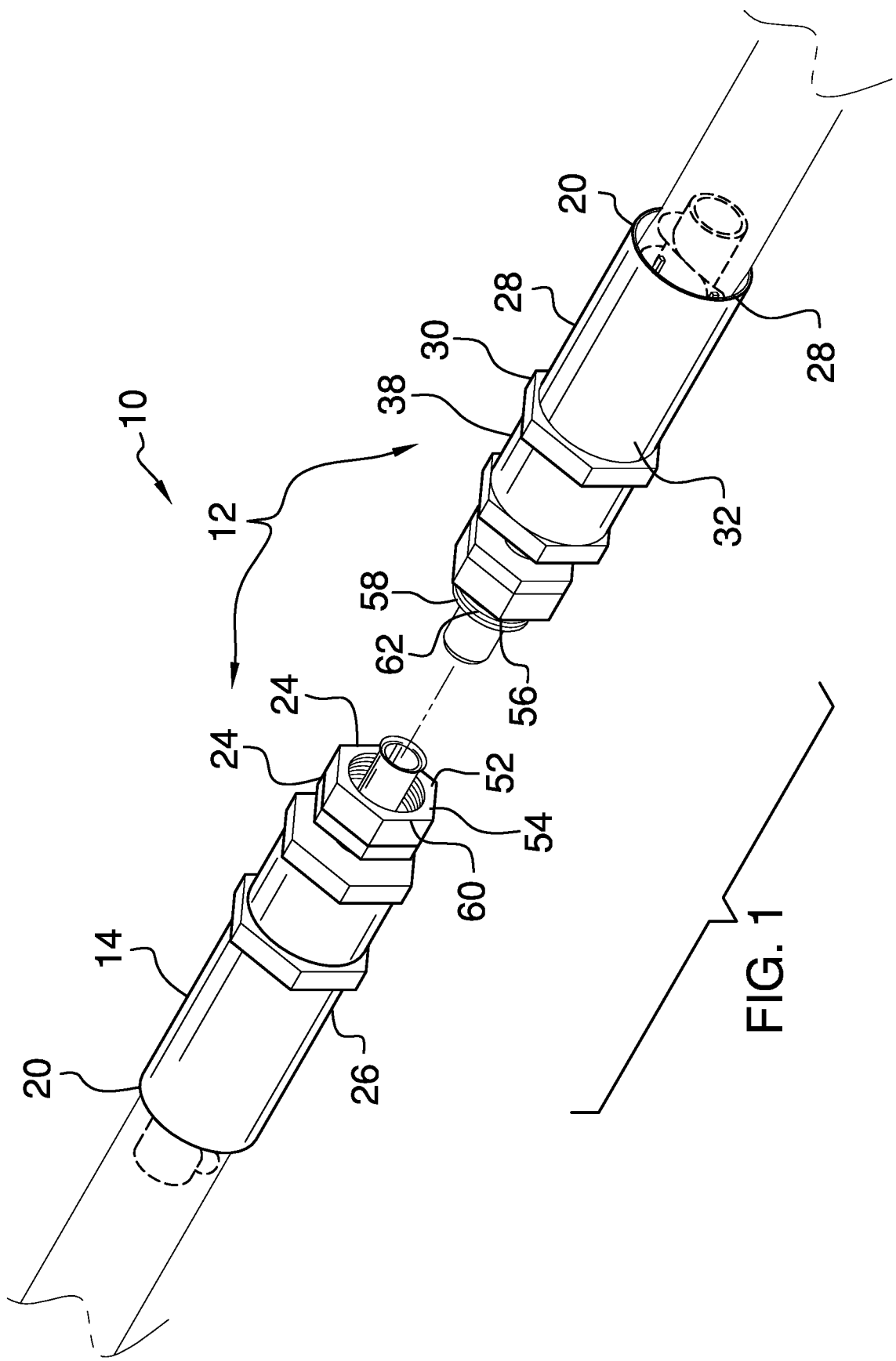
FIG. 1 is an isometric perspective view of a tubing splicing device according to an embodiment of the disclosure.
Figure 2:
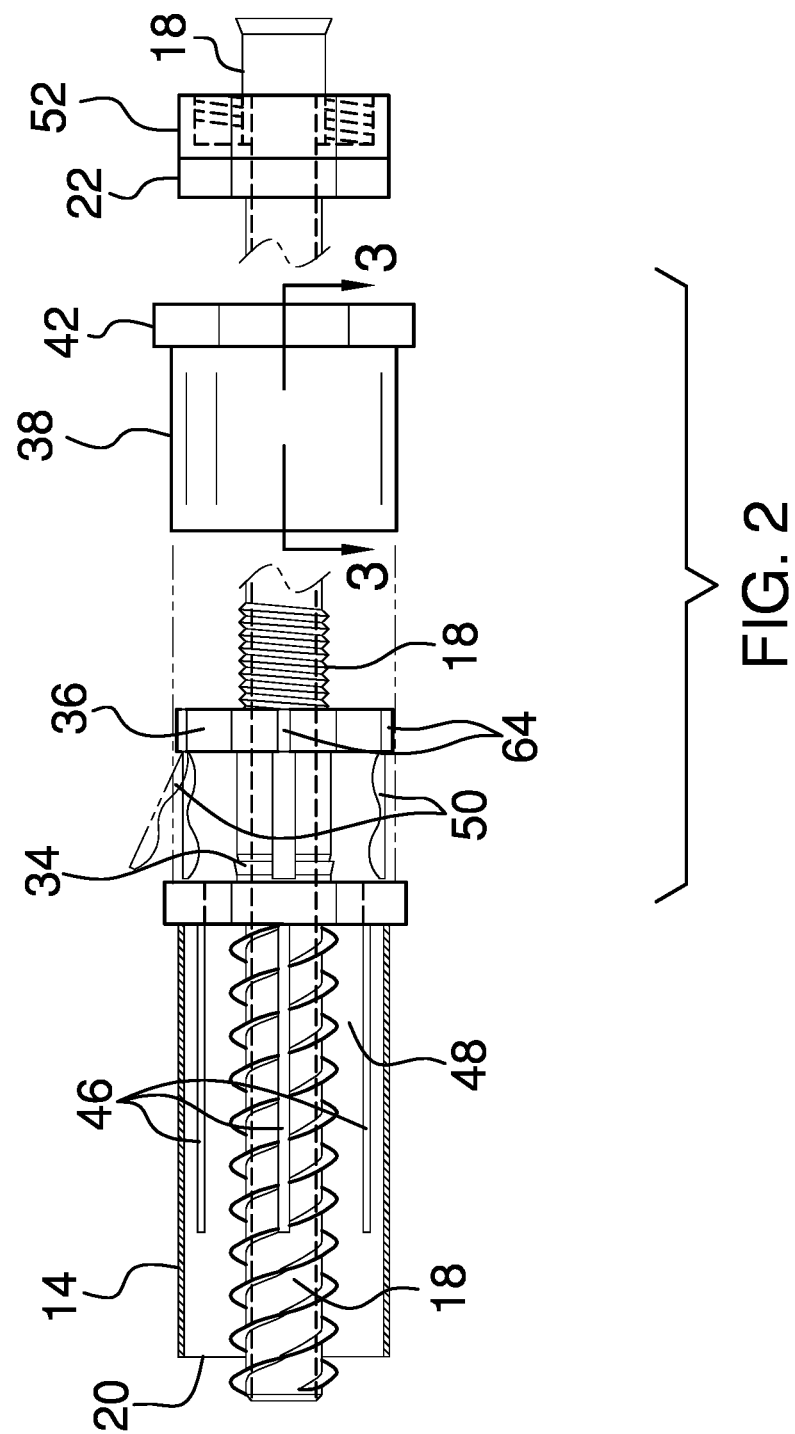
FIG. 2 is a cross-sectional view of an embodiment of the disclosure.
Figure 3:
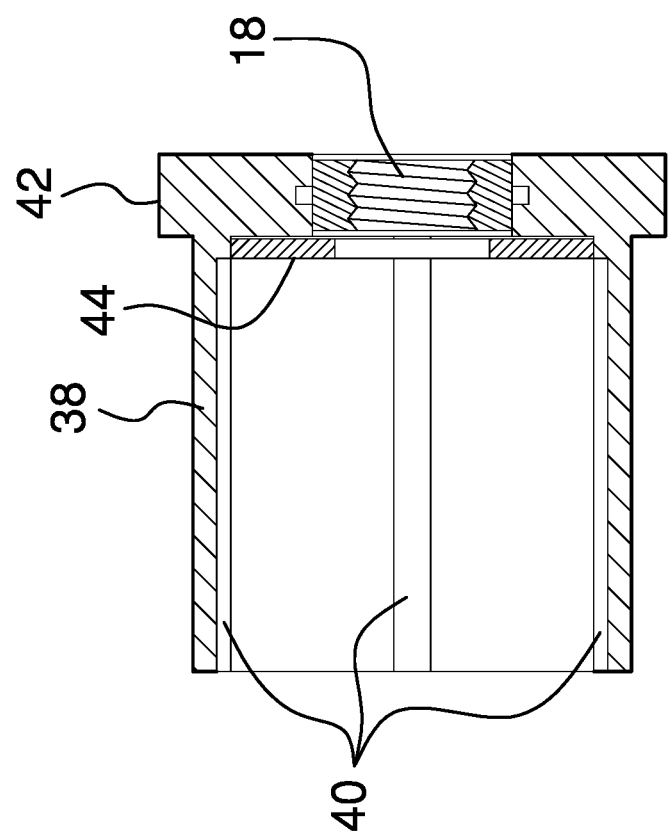
FIG. 3 is a cross-sectional view of an embodiment of the disclosure.

With reference now to the drawings, and in particular to FIGS. 1 through 3 thereof, a new splicing device embodying the principles and concepts of an embodiment of the disclosure and generally designated by the reference numeral 10 will be described.

As best illustrated in FIGS. 1 through 3, the tubing splicing device 10 generally comprises a pair of housings 12. Each housing 12 comprises a barrel 14 that has an inner diameter 16 which is substantially complementary to an external diameter of a tubular substrate. The barrel 14 is open-ended.

A pipe 18 positioned in and rotationally coupled to the barrel 14. The pipe 18 is externally threaded, as shown in FIG. 2. The pipe 18 is configured to be threadedly inserted into the tubular substrate such the tubular substrate is drawn into a first end 20 of the housing 12 to sealably couple the pipe 18 to the tubular substrate, as shown in FIG. 1.

A first nut 22 is fixedly coupled to the pipe 18 adjacent to a second end 24 of the housing 12. The pipe 18 protrudes through the first nut 22, as shown in FIG. 1. The pipe 18 of one of the housings 26 is flared distal from the one of the housings 26, as shown in FIG. 1. The pipe 18 of the other of the housings 28 is tapered distal from the other of the housings 28 so that the pipe 18 of the other of the housings 28 is complementary to the pipe 18 of the one of the housings 26.

A first barrel nut 30 is coupled to the barrel 14 proximate to a midpoint 32 of the housing 12, as shown in FIG. 2. A flare fitting 34 is positioned in the pipe 18 proximate to the first barrel nut 30.

A second barrel nut 36 is fixedly coupled to the pipe 18 proximate to the flare fitting 34. A plurality of protrusions 64 is coupled to and extend from the second barrel nut 36. A sleeve 38 is positioned over the second barrel nut 36 and extends to the first barrel nut 30. The sleeve 38 is malleable so that the sleeve 38 is configured to be crimped. A plurality of grooves 40 is positioned in the sleeve 38. Each protrusion 64 is positioned in a respective groove 40 to couple the sleeve 38 to the second barrel nut 36.

A third barrel nut 42 is threadedly coupled to the pipe 18 adjacent to the second barrel nut 36. The third barrel nut 42 is positioned to be rotated relative to the pipe 18 and the sleeve 38 so that the sleeve 38 is crimped between the third barrel nut 42 and the first barrel nut 30 to frictionally couple the housing 12 to the tubular substrate.

A washer 44 is positioned between the second barrel nut 36 and the third barrel nut 42, as shown in FIG. 3. The washer 44 is configured to facilitate rotation of the second barrel nut 36 relative to the third barrel nut 42.

Each of a plurality of ribs 46 is coupled to and extends perpendicularly from the first barrel nut 30 into the barrel 14 to define a gap 48 between the ribs 46 and the pipe 18, as shown in FIG. 2. The ribs 46 are positioned to be bent toward the barrel 14 as the tubular substrate is inserted into the gap 48. The ribs 46 urge the tubular substrate to contact the pipe 18. The ribs 46 function to allow tubular substrate having a variety of wall thicknesses to be coupled to the pipe 18.

A plurality of tabs 50 is coupled to and extends from the second barrel nut 36, as shown in FIG. 2. The tabs 50 are malleable and are configured to be crimped as the sleeve 38 is crimped.

A first coupler 52 is coupled to a second end 54 of the one of the housings 26. A second coupler 56 is coupled to a second end 58 of the other of the housings 28. The first coupler 52 comprises a female hose coupler 60 and the second coupler 56 comprises a male hose coupler 62. The second coupler 56, being complementary to the first coupler 52, is positioned to couple to the first coupler 52 to couple the one of the housings 26 to the other of the housings 28. The pipes 18 are sealably coupled to sealably couple two segments of the tubular substrate.

In use, the pipe 18 is partially inserted into the tubular substrate. A first wrench is positioned on the first nut 22 and a second wrench is positioned on the first barrel nut 30. Rotation of the first nut 22 relative to the first barrel nut 30 drives the pipe 18 into the tubular substrate, drawing the tubular substrate into the barrel 14 and sealably coupling the pipe 18 to the tubular substrate. The first wrench then is moved to the third barrel nut 42. Rotating the third barrel nut 42 relative to the first barrel nut 30 crimps the sleeve 38 onto the tubular substrate. With the one of the housings 26 coupled to a first segment of the tubular substrate and the other of the housings 28 coupled to a second segment of the tubular substrate, a user is positioned to couple the male hose coupler 62 to the female hose coupler 60 to splice the two segments of the tubular substrate.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A tubing splicing device comprising:
   a pair of housings, each housing comprising:
      a barrel having an inner diameter substantially complementary to an external diameter of a tubular substrate, the barrel being open-ended, and
      a pipe positioned in and rotationally coupled to the barrel, the pipe being externally threaded wherein the pipe is configured for threadedly inserting into the tubular substrate such the tubular substrate is drawn into a first end of the housing for sealably coupling the pipe to the tubular substrate;
   a first coupler coupled to a second end of one of the housings; and
   a second coupler coupled to a second end of the other of the housings, the second coupler being complementary to the first coupler wherein the second coupler is positioned for coupling to the first coupler for coupling the one of the housings to the other of the housings such that the pipes are sealably coupled for sealably coupling two segments of the tubular substrate.

2. The device of claim 1, further comprising:
   a first nut fixedly coupled to the pipe adjacent to a second end of one of the housings, the pipe protruding through the first nut, the pipe of one of the housings being flared distal from the one of the housings, the pipe of the other of the housings being tapered distal from the other of the housings such that the pipe of the other of the housings is complementary to the pipe of the one of the housings;
   a first barrel nut coupled to the barrel proximate to a midpoint of the other one of the housings;
   a second barrel nut fixedly coupled to the pipe proximate to a flare fitting;
   a sleeve positioned over the second barrel nut and extending to the first barrel nut, the sleeve being malleable such that the sleeve is configured for crimping; and
   a third barrel nut threadedly coupled to the pipe adjacent to the second barrel nut, the third barrel nut being positioned for rotating relative to the pipe and the sleeve such that the sleeve is crimped between the third barrel nut and the first barrel nut for frictionally coupling the housing to the tubular substrate.

3. The device of claim 2, further including the flare fitting being positioned in the pipe proximate to the first barrel nut.

4. The device of claim 2, further comprising:
   a plurality of protrusions coupled to and extending from the second barrel nut; and
   a plurality of grooves positioned in the sleeve such that each protrusion is positioned in a respective groove for coupling the sleeve to the second barrel nut.

5. The device of claim 2, further including a washer positioned between the second barrel nut and the third barrel nut wherein the washer is configured for facilitating rotation of the second barrel nut relative to the third barrel nut.

6. The device of claim 2, further including a plurality of ribs coupled to and extending perpendicularly from the first barrel nut into the barrel defining a gap between the ribs and the pipe wherein the ribs are positioned for bending toward the barrel as the tubular substrate is inserted into the gap wherein the ribs urge the tubular substrate to contact the pipe.

7. The device of claim 2, further including a plurality of tabs coupled to and extending from the second barrel nut, the tabs being malleable wherein the tabs are configured for crimping as the sleeve is crimped.

8. The device of claim 1, further including the first coupler comprising a female hose coupler, the second coupler comprising a male hose coupler.

9. A tubing splicing device comprising:
a pair of housings, each housing comprising:
- a barrel having an inner diameter substantially complementary to an external diameter of a tubular substrate, the barrel being open-ended, and
- a pipe positioned in and rotationally coupled to the barrel, the pipe being externally threaded wherein the pipe is configured for threadedly inserting into the tubular substrate such the tubular substrate is drawn into a first end of the housing for sealably coupling the pipe to the tubular substrate,
- a first nut fixedly coupled to the pipe adjacent to a second end of the housing, the pipe protruding through the first nut, the pipe of one of the housings being flared distal from the one of the housings, the pipe of the other of the housings being tapered distal from the other of the housings such that the pipe of the other of the housings is complementary to the pipe of the one of the housings,
- a first barrel nut coupled to the barrel proximate to a midpoint of the housing,
- a flare fitting positioned in the pipe proximate to the first barrel nut,
- a second barrel nut fixedly coupled to the pipe proximate to the flare fitting,
- a plurality of protrusions coupled to and extending from the second barrel nut,
- a sleeve positioned over the second barrel nut and extending to the first barrel nut, the sleeve being malleable such that the sleeve is configured for crimping,
- a plurality of grooves positioned in the sleeve such that each protrusion is positioned in a respective groove for coupling the sleeve to the second barrel nut,
- a third barrel nut threadedly coupled to the pipe adjacent to the second barrel nut, the third barrel nut being positioned for rotating relative to the pipe and the sleeve such that the sleeve is crimped between the third barrel nut and the first barrel nut for frictionally coupling the housing to the tubular substrate,
- a washer positioned between the second barrel nut and the third barrel nut wherein the washer is configured for facilitating rotation of the second barrel nut relative to the third barrel nut,
- a plurality of ribs coupled to and extending perpendicularly from the first barrel nut into the barrel defining a gap between the ribs and the pipe wherein the ribs are positioned for bending toward the barrel as the tubular substrate is inserted into the gap wherein the ribs urge the tubular substrate to contact the pipe, and
- a plurality of tabs coupled to and extending from the second barrel nut, the tabs being malleable wherein the tabs are configured for crimping as the sleeve is crimped;
a first coupler coupled to a second end of the one of the housings; and
a second coupler coupled to a second end of the other of the housings, the second coupler being complementary to the first coupler wherein the second coupler is positioned for coupling to the first coupler for coupling the one of the housings to the other of the housings such that the pipes are sealably coupled for sealably coupling two segments of the tubular substrate, the first coupler comprising a female hose coupler, the second coupler comprising a male hose coupler.

* * * * *